United States Patent [19]
Cartwright et al.

[11] Patent Number: 5,352,866
[45] Date of Patent: Oct. 4, 1994

[54] FRYER TEMPERATURE CONTROL SYSTEM

[75] Inventors: Richard W. Cartwright, Piqua; Joseph A. Lang, Jr., Kettering; Raymond M. Lepore, Troy, all of Ohio

[73] Assignee: Premark FEG Corporation, Wilmington, Del.

[21] Appl. No.: 775,138

[22] Filed: Oct. 11, 1991

[51] Int. Cl.$^5$ .............................................. H05B 1/02
[52] U.S. Cl. ..................................... 219/497; 219/442; 219/492; 99/403; 99/330
[58] Field of Search ............... 219/492, 494, 497, 501, 219/506, 485, 440–442; 99/330, 325, 403, 334, 336; 307/117

[56] References Cited

U.S. PATENT DOCUMENTS

| | | | |
|---|---|---|---|
| 3,240,428 | 3/1966 | Umrath | 236/78 |
| 3,326,692 | 6/1967 | Martino et al. | 99/111 |
| 4,197,581 | 4/1980 | Watrous et al. | 364/400 |
| 4,430,698 | 2/1984 | Harris | 364/162 |
| 4,437,159 | 3/1984 | Waugh | 364/400 |
| 4,601,004 | 7/1986 | Holt et al. | 364/557 |
| 4,636,949 | 1/1987 | Longabaugh | 364/400 |
| 4,663,710 | 3/1987 | Waugh et al. | 364/400 |
| 4,672,540 | 6/1987 | Waugh et al. | 364/400 |
| 4,858,119 | 8/1989 | Waugh et al. | 364/400 |

Primary Examiner—Mark H. Paschall
Attorney, Agent, or Firm—Thompson, Hine and Flory

[57] ABSTRACT

An oil fryer control system simultaneously controlling oil temperature and cooking time. A proportional, integral and derivative temperature control is used to maintain the oil temperature below and above a predetermined set point temperature. In addition, a cooking time control varies the cooking time within a predetermined range of temperature error as a function of a stored time-temperature relationship. The invention provides the capability of cooking different products having different cooking parameters in the same or different oil vats.

22 Claims, 8 Drawing Sheets

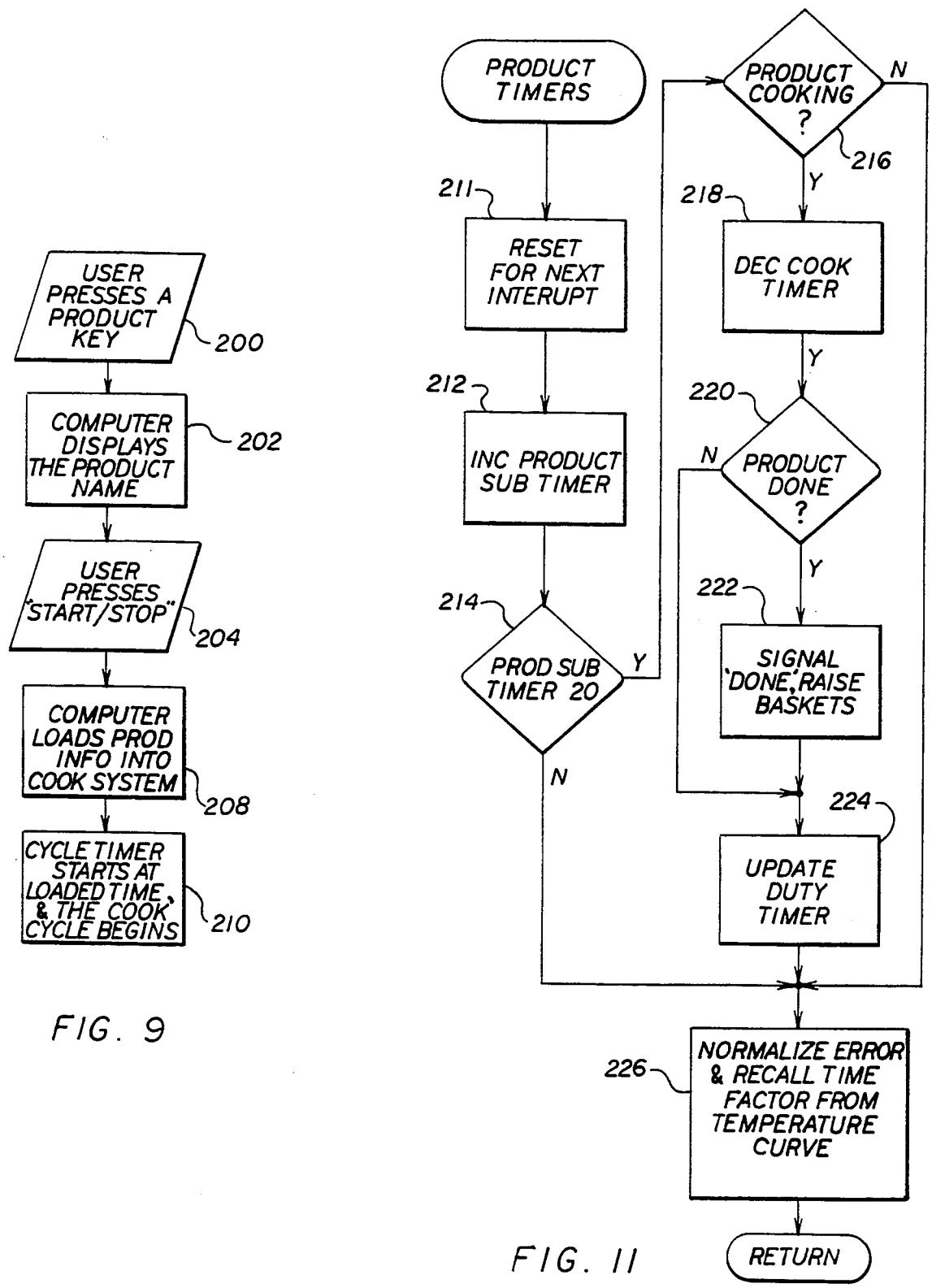

FRYER TEMPERATURE CONTROL SYSTEM

FIELD OF THE INVENTION

The invention relates generally to the field of oil fryer controls. More particularly, the invention provides a microprocessor based oil fryer control in which oil temperature is regulated by a proportional, integral and derivative temperature control in response to an oil temperature error; and cooking time is regulated in response to a programmed cooking time and the oil temperature error.

BACKGROUND OF THE INVENTION

Typically, cooking recipes define a cooking cycle in terms of two variables—time and temperature. However, it is not unusual for recommended times and temperatures to be modified or tuned by individuals based on personal experience. Such modification or tuning is to be expected since any time-temperature relationship will be a function of several other product based factors, e.g. the initial temperature of the food, the amount of the food, the water content of the food, the initial temperature of the cooking appliance, the rate at which the cooking appliance can supply heat, etc.

Variations in the above factors will produce temperature changes during a cooking cycle different from the temperature changes anticipated in an established time-temperature cooking relationship. Within a limited range or bandwidth, such variations in temperature may be compensated for by changing the cooking time. In addition, consistency in cooking will also depend on the ability of the cooking appliance to precisely detect and control temperature.

Microprocessor based oil fryer controls which change cooking time as a function of variations in temperature during a cooking process have been part of the literature for years. For example, U.S. Pat. No. 4,636,949 issued to C. R. Longabaugh for Method and Apparatus for Controlling Cooking Cycles in a Cooking System discloses a control in which a plurality of complex cooking cycles may be programmed. Each cooking cycle may have up to eight combinations of time and temperature set points that describe a unique time-temperature profile for that cycle. In addition, the operator may define an alternate set point to change the time or final temperature of a cooking cycle. Finally, the heater elements are divided into two groups so that when the oil temperature approaches the desired set point, one heater element may be deenergized, and the set point achieved with the application of less heat thereby reducing temperature overshoot.

In addition to the above, there are a large number of other cooking time adjustment philosophies. Further, there are a number of cooking temperature controls which are improvements over the typical on/off temperature control. For purposes of this description, on/off temperature control is effected by cycling a heater on at full power and off depending on whether oil temperature is below or above, respectively, a predetermined temperature. Such temperature control is effective to quickly raise the oil temperature to a predetermined value, but it has an inherent problem of temperature overshoot which results in an undesirably high temperature. The improved temperature controls provide various techniques for minimizing or eliminating overshoot and adjusting power to the oil heater in a temperature bandwidth below the predetermined temperature.

While a purported advantage, the requirement of defining a cooking curve for each cooking cycle may be also viewed as a disadvantage. Further, even though the ability to control two sets of oil heater elements provides some control over temperature overshoot, it is a very imprecise control. Applicants believe that the above control mechanism may be simplified without losing cooking quality.

SUMMARY OF THE INVENTION

The present invention has an improved temperature control which is provided by a proportional, integral and derivative temperature control. Such a temperature control has the advantage that given the physical characteristics of a fryer, that is, the geometry of the vat, the quantity of oil, the heater power, etc., the temperature control can be tuned to provide a preferred optimization or balance between rate of temperature rise and temperature overshoot. Contrary to past temperature control philosophies, applicants make no attempt to eliminate temperature overshoot. In contrast, with applicants' temperature control, a certain magnitude of temperature overshoot may be controllably defined and tolerated within the system. Such temperature control is possible because the PID temperature control has greater accuracy and repeatability than that achieved with prior fryer temperature control systems.

The invention also has a simple cooking time control. Cooking time variation is provided by a single time-temperature relationship stored in the control. An advantage is that the user need only define a time and temperature, and the control will cook the product according to the user settings and the stored internal relationship. Applicants believe that their improved temperature control is effective to provide a less complex and more reliable cooking time control.

The invention also provides the ability to cook different products having different programmed temperatures in the same or different vats. The control permits the programming of temperatures in association with each product programmed. Further, the control provides separate and independent temperature controls and cooking timing controls for each vat. Consequently, the operation of the controller has the advantage that when different products with different temperatures are selected, the proper oil temperature is automatically chosen without having to be reset. Further, if desired, different products having different programmed temperatures may be cooked in the same oil vat.

The invention also provides an improved idle mode in which the oil temperature is automatically set back to a programmed setback value. This feature provides the advantage of extending the life of the cooking oil.

Further features and advantages of the invention shall become apparent from the accompanying drawings, the following description and appended claims.

BRIEF DESCRIPTION OF THE DRAWINGS

FIG. 9 illustrates a process by which a product is selected and a cooking cycle initiated.

FIG. 11 is a flowchart illustrating the process steps executed in controlling cooking cycle timers.

DESCRIPTION OF THE PREFERRED EMBODIMENTS

Figure 1:
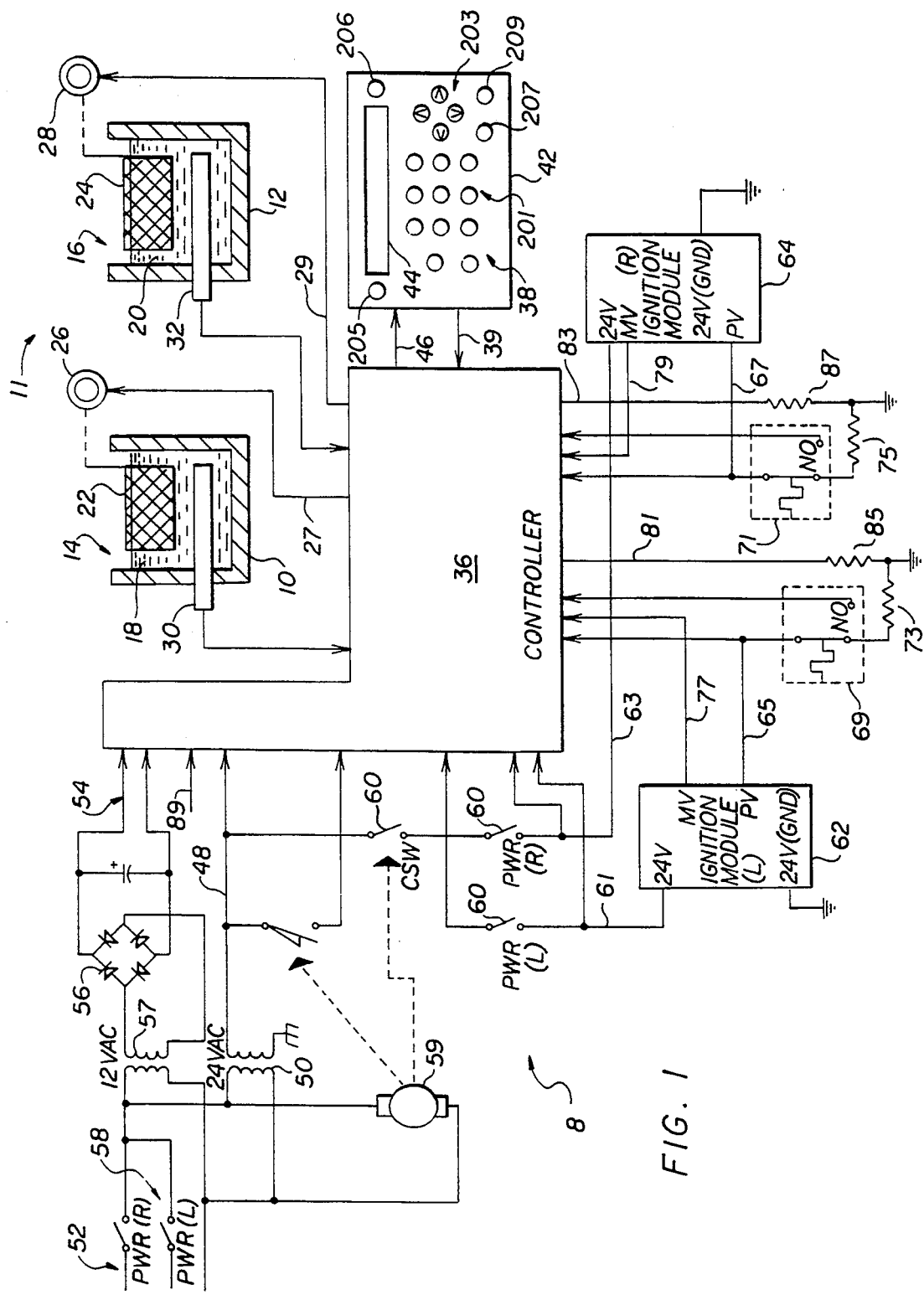
FIG. 1 is an overall schematic diagram of an oil fryer and control.

Referring to FIG. 1, a fryer control 8 is effective to regulate the cooking of the same or different products in two vats of oil or of the same or different products in a single vat of oil. Typically, a deep fat fryer 11 may include a left vat 10 and a right vat 12 which have respective chambers 14 and 16 containing cooking oil or other fluid 18 and 20. The food to be cooked is placed in baskets 22 and 24 which are placed into and removed from the oil. The baskets may be handled manually, or they may be automatically placed into and removed from the oil. In FIG. 1, basket lift motors 26 and 28 are operatively connected to the baskets 22 and 24, respectively. The motors 26 and 28 are controlled by drive signals on lines 27 and 29, respectively. The temperature of the oil is measured by thermistor probes 30 and 32 or similar devices which are connected to a controller 36 and provide analog signals varying as a function of the temperature changes of the oil.

Time and temperature cooking relationships for various products may be established by utilizing a keypad 38 of the operator control panel 42. The keypad 38 transfers signals to the controller 36 on line 39. Also part of the operator panel is a visual display 44 having a predetermined number of display characters. All of the characters may be used for a single message, or the display characters may be divided to provide displays for the left and right vats. The visual display receives signals from the controller 36 on line 46 to selectively display product identifications, oil temperatures, cooking times, etc. Line 48 provides AC power to controller 36 from a step-down transformer 50 connected to an AC power source 52. DC power is supplied on the lines shown at 54 from the full-wave rectifier 56 connected to step down transformer 57. In response to one or more signals selectively generated by the controller to energize the oil heaters, switches shown at 58 are selectively closed to energize a combustion blower 59. In addition, closure of other switches shown at 60 permit power to be selectively applied to ignition modules 62 and 64 associated with left and right oil heaters (not shown).

Although the fryer may employ either gas or electric heaters, the ignition modules 62 and 64 are designed for use with gas heaters. The ignition modules are commercially available devices such as the S8600 series of intermittent pilot modules available from Honeywell, Inc.. Upon receiving power signals on lines 61 and 63, the ignition modules provide pilot valve signals on lines 65 and 67. The pilot valve signals are inputs to the controller 36 and, in addition, pass through contacts of left and right temperature limit switches 69 and 71 prior to energizing pilot valve solenoids 73 and 75 for the left and right vats 10 and 12, respectively. The pilot valve solenoids open pilot valves, and the ignition modules provide electronic ignition of pilot flames. Upon successful ignition of the pilot flames, the modules then provide main valve signals on lines 77 and 79 to the controller 36. Circuitry on the controller 36 converts the signals on lines 77 and 79 into signals on lines 81 and 83 which are effective for energizing solenoid coils 85 and 87 in the main gas valves for gas burners (not shown) associated with the vats 10 and 12, respectively. Energization of the solenoid coils 85 and 87 open the main gas valves and permit the flow of gas which is ignited by the pilot flames. The high temperature limit switches 69 and 71 are placed in proximity to the oil 18 and 20, respectively, such that when the oil exceeds a predetermined maximum temperature, e.g., 450° F., the thermal limit switches 69 and 71 will open thereby deenergizing pilot solenoids 73 and 75 and causing the main valve solenoids 85 and 87 to be deenergized. The ignition modules 62 and 64 and high temperature limit switches 69 and 71 are commercially available devices and are utilized as they were commercially intended.

As is indicated in FIG. 1, the control is effective to provide a number of input signals to the controller 36 as indicated by arrowheads pointing toward the controller 36. Such input signals include the combustion blower being on, a pilot valve being energized, a main gas supply valve being energized, a high temperature limit switch being activated, etc. In addition, input signals are created by the keypad 38 and other mechanisms which define conditional states of operation of the fryer control. For example, input 89 is set to 24 VAC or ground depending on whether the fryer contains a single vat or two vats as illustrated in FIG. 1.

Figure 2:
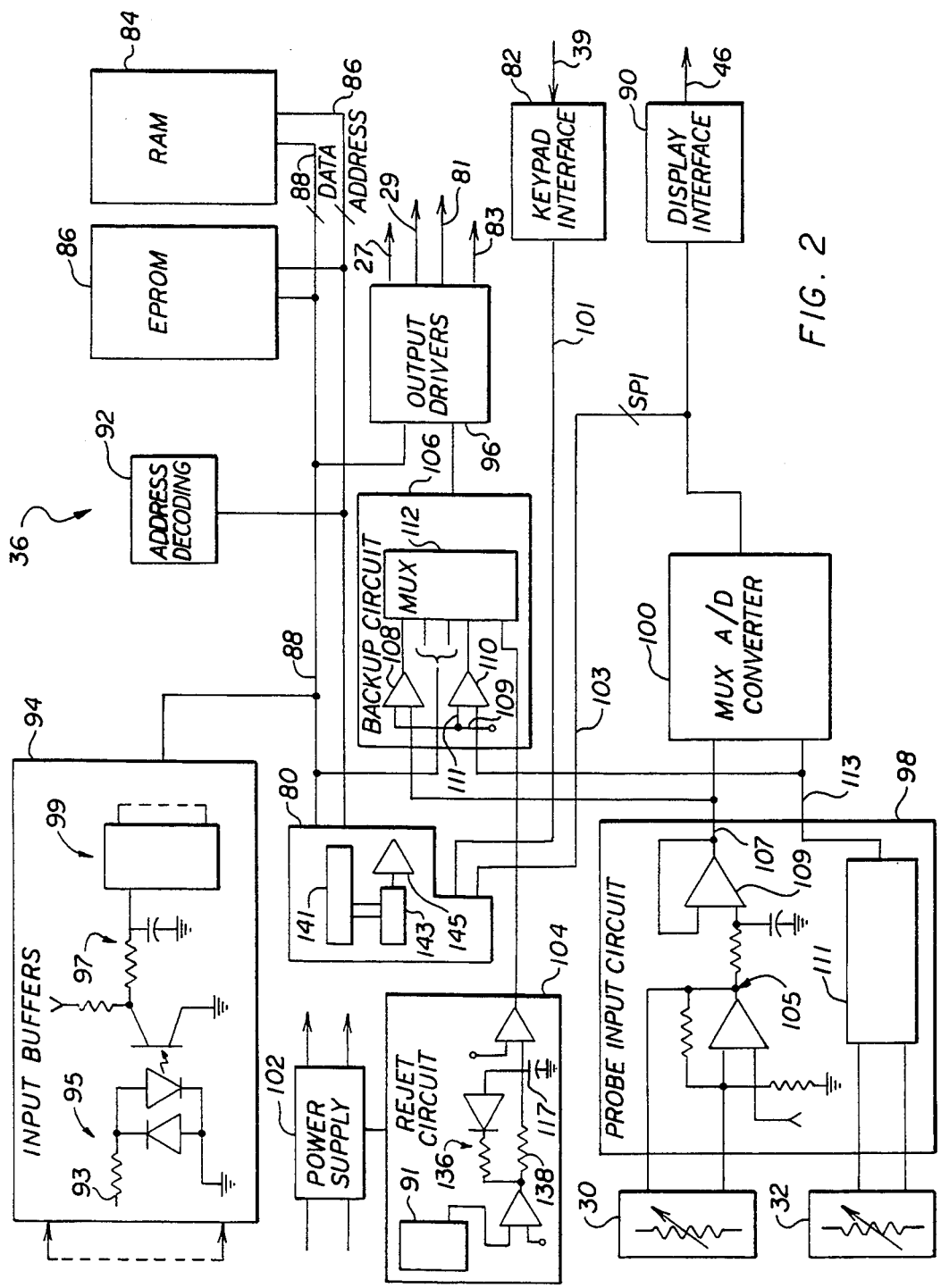
FIG. 2 is a schematic block diagram of a controller illustrated in FIG. 1.

Referring to FIG. 2, which is a schematic drawing of controller 36, overall control of the fryer is provided by a microcontroller 80 identified as Part No. MC68HC11A1 available from Motorola. A description of the operation and application of the M68HC11 family of microcontroller units is contained in the *M68HC11 Reference Manual* published by Prentice Hall, Inglewood Cliffs, New Jersey 07632. The entire contents of the aforementioned *M68HC11 Reference Manual* are hereby incorporated herein by reference.

The microcontroller 80 receives input signals through input buffer 94. A single buffer circuit is illustrated and is duplicated for each input signal. An input signal from a device outside the controller 36 is received on an input 93 of an optocoupler stage 95. An RC filter 97 helps to stabilize an output from the optocoupler 95 prior to its input to a data buffer 99. Outputs from the data buffer 99 are transferred under control of the microcontroller 80 across data line 88 to the random access memory ("RAM") 84. The microcontroller controls the storage location of the data within the RAM by means of address signals transmitted across line 86 which correspond to the data signals.

Upon depression of keys on the keypad 38, signals are transmitted to the keypad interface 82. The keypad interface contains a data buffer for each key. The input to the data buffer is locked to one of two DC voltage levels depending on the state of the key. The voltage levels are established within the keypad interface 82 by an input protection and pull-up resistor network for each key input. The network includes a diode clamp protection which clamps the input to the DC power supply. An output signal from the data buffer is transferred to the microcontroller 80 via line 101. During the operation of the fryer, the microcontroller 80 is effective to provide data on output line 103 to the display interface 90. The display interface is effective to selectively display under microcontroller control product names, cooking times, cooking temperatures, etc.

The address decoder 92 operates with microcontroller 80 to read or write data from the appropriate location in either the RAM memory 84 or the EPROM memory 86. The EPROM memory 86 stores a number of operating subroutines that define temperature control algorithms, cooking time algorithms and other programmed operations associated with the fryer control.

The temperature probes 30 and 32 have an internal resistance that varies as a function of the oil temperature. The probes are connected to a probe input circuit 98 which contains a signal conditioning circuit for each of the probes. Referring to the probe 30, the probe resistance is part of a divider network in a feedback circuit of operational amplifier circuit 105. Changes in oil temperature result in corresponding changes in the resistance of probe 30 which, in turn, results in gain changes of amplifier circuit 105. The net result is that the amplitude of the analog output signal on line 107 from inverting amplifier 109 changes in direct proportion to the oil temperature. An identical signal conditioning circuit 111 is associated with temperature probe 32 to produce a corresponding analog signal on line 113. A multiplexing analog-to-digital converter 100 is responsive to the analog probe signals on lines 107 and 113; and under control of microcontroller 80, the converter is effective to selectively convert the analog signals on lines 107 and 113 to respective digital probe signals having magnitudes corresponding to the amplitudes of the analog signals. The converter 100 is of the type comparable to the LTC 1090 10-bit data acquisition system available from Linear Technology Corp. The digital probe signal on line 103 is input to the microcontroller 80 via a Serial Peripheral Interface which provides a communication link on a serial data bus for several devices including the temperature probe. The digital probe signal is then transmitted on data line 88 to a storage location in RAM 84.

The controller 36 has a power supply 102 which provides separate sources of power for the analog circuit elements and digital circuit elements within the controller 36. A reset circuit 104 includes a standard watchdog timer 91 which is effective to reset the microcontroller 80 in the absence of normal activity over a predetermined period of time. The watchdog timer may be implemented by a microprocessor supervisory circuit similar to the MAX 690 EPA available from Maxim Integrated Products.

The controller 36 also includes a backup circuit 106 which is effective to control the oil heaters in the absence of control from microcontroller 80. Amplifiers 108 and 110 have first inputs 109 and 111, respectively, providing an analog voltage representing a desired oil temperature. Another input of each of the amplifiers 108 and 110 is responsive to a respective analog signal from the probe circuit 98. The outputs of amplifiers 108 and 110 are error signals representing the difference between the desired oil temperature and the actual oil temperature. A multiplexer 112 is connected to the output of amplifiers 108 and 110 and, in addition, is connected to left vat and right vat heat control signals from data line 88. Under normal operating conditions, the multiplexer 112 is effective to provide heat control signals from data line 88 to output drivers 96. In essence, the output drivers provide an interface that creates a signal having a power suitable for operating the device associated with that signal which is connected to the controller 36.

The multiplexer 112 is also connected to the reset circuit 104. The reset circuit 104 controls a switch-over to analog temperature control by the illustrated resistance-capacitance network within the reset circuit 104. When the microcontroller is operating properly, an output from the watchdog timer 91, e.g., not-reset, is maintained, and that maintains a signal to multiplexer 112 via line 115. If the watchdog timer toggles within a predetermined time, e.g., 1.2 seconds, the output switches low. Capacitor 117 discharges through the resistor-diode leg 136, and the output to multiplexer 112 on line 115 changes state. That causes the multiplexer 112 to multiplex output signals from amplifiers 108 and 110 to the output drivers 96 thereby regulating the oil temperature to the temperature defined on the inputs of the amplifiers. If the watchdog timer begins toggling again, Capacitor 117 is recharged through resistor 138. The valves of the resistor 138 and the capacitor may be selected so that the output on line 115 does not switch again until at least one toggle of the watchdog timer. In the preferred embodiment, the charging time is set at approximately 2.5 seconds. The output drivers 96 are also connected directly to the data line 88 to provide other output signals such as, for example, signals for engaging the basket lift motors 26 and 28. Each output driver is implemented with an FET driving a relay coil.

The interconnection of microcontroller 80 to the RAM 84, EPROM 86 and associated address decoding is explained in detail in the M68HC11 reference manual previously referenced. As further described in Chapter 10 of that manual, the microcontroller 80 contains a 16-bit free-running counter 141 and five 16-bit output-comparator circuits which are used to independently detect different states of the counter 141 and generate an interrupt as a function thereof. A typical output compare register 143 is shown connected to an interrupt gate 145. For example, one output-compare circuit may be used to create a 100 millisecond ("ms") interrupt. To accomplish that, the output-compare register is loaded with a state, i.e., number, which will be achieved by the free-running counter 100 ms after the time it begins counting. When that state is detected, an interrupt is created, and the output-compare is loaded with another number representing the counter state achieved after a subsequent 100 ms time interval. That process is repeated continuously for as long as power is applied to the microcontroller. In addition to the above 100 ms main timer, other output-compare circuits within the microcontroller are used to provide a 10 ms timer, a keypad debounce timer and product timers for the left and right vats.

Figure 3:
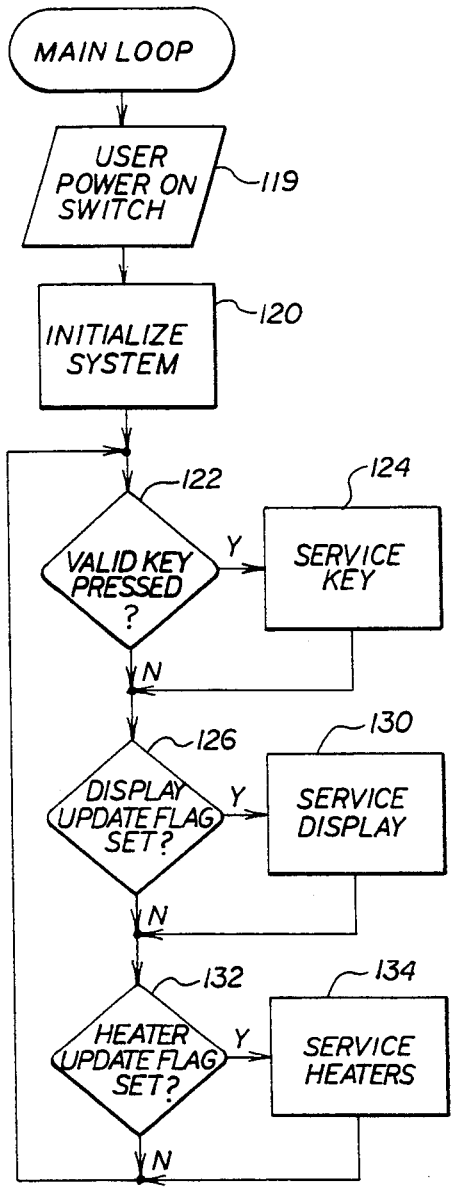
FIG. 3 is a flowchart illustrating the process steps in the execution of a main system loop.

FIG. 3 illustrates a main system loop process which is executed continuously while power is applied to the microcontroller 80. After power is switched on as shown by input block 119, in step 120, the control system is initialized. During that process, the I/O, RAM and the display are set to initial values; and power-on diagnostics are executed. After that, the program determines in successive steps whether a key in keypad 38 has been pressed, whether an update to display 44 is required and whether a new heater duty cycle should be calculated.

Figure 4:
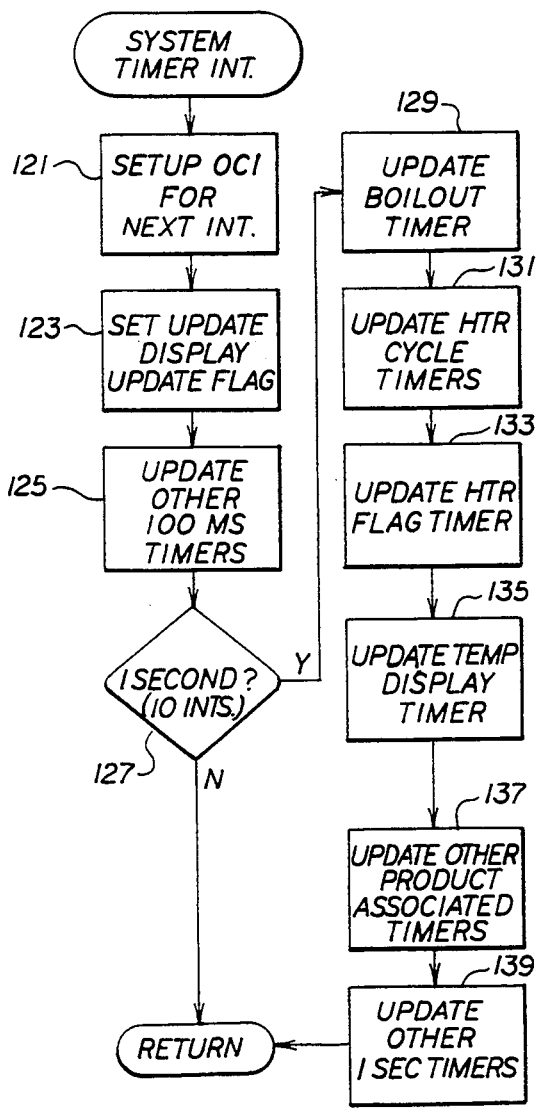
FIG. 4 is a flowchart illustrating the process steps for a main system timer interrupt routine.

To better understand the operation of the main system loop of FIG. 3, the main system timer interrupt subroutine illustrated in FIG. 4 will be discussed. As previously mentioned, microcontroller 80 contains a number of output-compare circuits associated with the free-running system timer which function as counters to generate various timing intervals. One of the output-compare circuits generates a 100 ms interrupt and is defined as the main system timer. Each time that output-compare circuit generates a 100 ms interrupt, the process of FIG. 4 is executed. In process step 121, the 100 ms output-compare register is loaded with a number or set to a state such that an interrupt will be generated after another interval of 100 ms. At this point, all of the activities which are required to be updated on a 100 ms basis are executed in an order determined by the system designer. In this case, it was decided to update the display with new information every 100 ms. Therefore, as shown in process step 123, an update display flag is set. Returning to FIG. 3, in executing the main system loop subroutine, decision block 126 checks whether the update display flag has been set. If so, as shown in process step 130, the controller 80 provides new display outputs to the display 44 via the display interface 90.

Returning to FIG. 4, process in step 125 requires that other activities within the control requiring a 100 ms update be executed. Such activities may include updating the timers for a warning buzzer, updating timers for a display flasher, updating error timers, etc. In decision step 127, the process is effective to count ten 100 ms time intervals thereby providing a one-second time interval. Upon detecting a one-second interval, the boilout timer is updated or incremented, as shown in process step 129; as indicated in process steps 131 and 133, a heater cycle timer and heater flag timer are updated or incremented by one. In addition, the temperature display timer is updated as indicated in process step 135. Process step 137 updates other product associated timers such as the duty timer and the hold timer; and process step 139 updates other activities that must be serviced on a one-second basis. Such activities may include the idle timer, basket lift motors, alternating display timers, etc. The activities described with reference to FIG. 4 will occur in response to the 100 ms main system timer interrupt which is generated by one of the output-compare circuits from the microcontroller 80.

Returning to FIG. 3, process in step 122 determines whether a valid key has been pressed. When the keypad interface 82 provides a keypad interrupt to microcontroller 80 indicating that the keypad has changed state, the microcontroller 80 executes a key debounce subroutine (not shown) which is effective to identify the key and initiate the key debounce timer by loading an output-compare within the microcontroller 80. If the key debounce subroutine successfully detects a valid key, the identity of the key is decoded and stored. The detection in decision block 122 of FIG. 3 that a valid key has been pressed will result in that key being serviced by step 124. The net result is that any subroutines associated with the valid key will be executed. In step 132, the subroutine checks to see whether the heat control timer has expired. The heat control timer is a five-second timer and, upon expiration, per process step 134, a heater duty cycle and corresponding heater control values are generated as set forth in FIG. 6.

Within the controller 36, a temperature control and a product cooking time control operate independently and asynchronously in response to predetermined temperatures and cooking times, respectively. Further, melt, idle, heating, ready and cook are the five modes of fryer operation provided by the controller. The melt, idle and cook modes are user selectable; and in the absence of a selection, the system will default to the heating and ready modes. The general operation of the temperature control loop is the same regardless of the operating mode, however, a new mode of operation may define a new oil temperature set point, i.e., the oil temperature to be maintained by the temperature control. In the cooking mode, the control regulates product cooking time in direct proportion to temperature error i.e., the difference between a predetermined temperature and the current oil temperature. The temperature error is converted to a change in cooking time according to a fixed temperature error-change in cooking time relationship.

Temperature Control

The temperature control uses proportional, integral and derivative control to maintain the oil temperature at a predetermined oil temperature. Within a predetermined temperature bandwidth about a predetermined temperature ($T_{sp}$), e.g., ($T_{sp} - 15°$ F.)$\leq T_{sp} \leq (T_{sp} + 5°$ F.), the duty cycle of the oil heater is varied to effect the desired control. At oil temperatures below the bandwidth, the heater is set to a 100% duty cycle, and for oil temperatures above the bandwidth, the heater is set to a zero duty cycle. If the oil temperature is less than 135° F. and a melt cycle is selected, the duty cycle is fixed at 10%.

Figure 5:
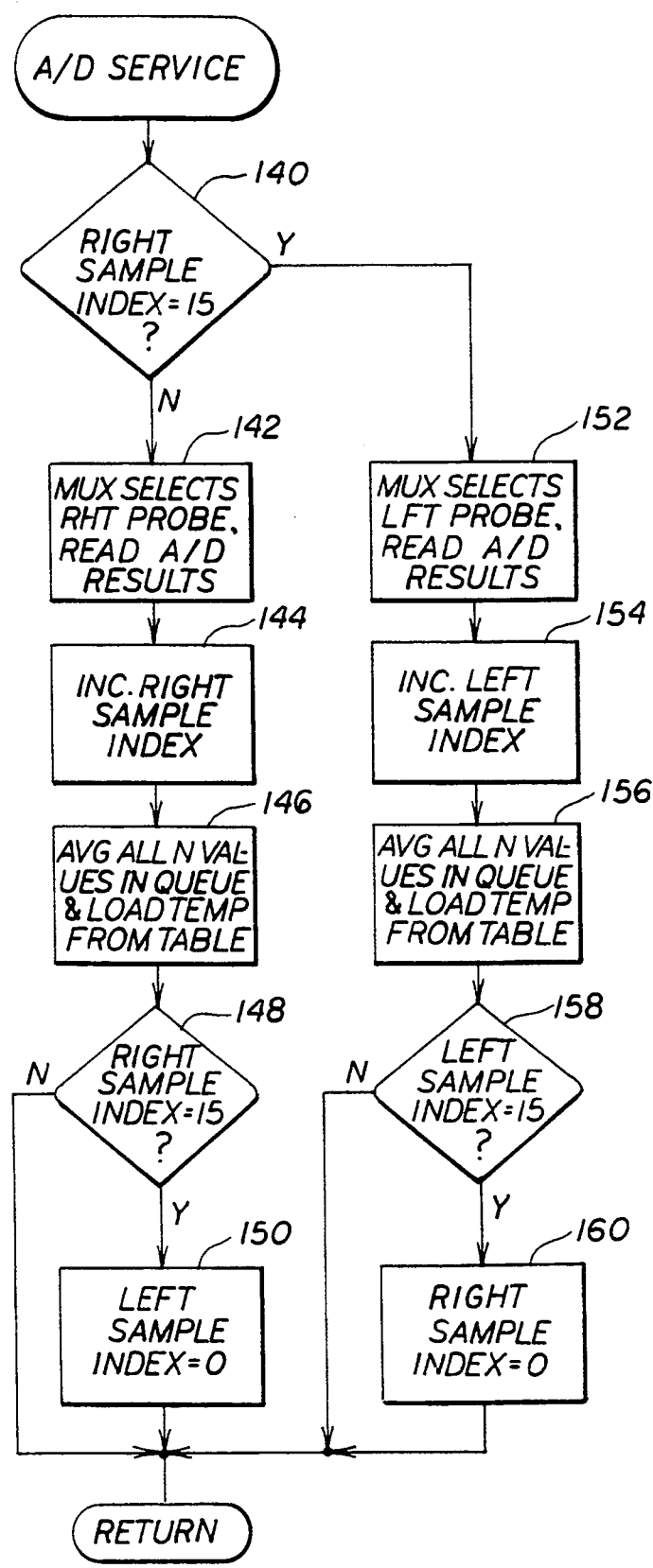
FIG. 5 is a flowchart of the process steps required to read a temperature probe, produce a corresponding digital signal, filter that signal and store a temperature.

Cooking oil temperature is detected by one or more temperature sensing means such as the commercially available thermistor probes 30, 32. The microcontroller 80 executes an A/D service subroutine shown in FIG. 5 in order to produce and store in RAM 84 a digital signal representing oil temperatures measured by probes 30 and 32. With each output-compare interrupt defining a 10 ms first time interval, the subroutine of FIG. 5 is executed to read a temperature, average it with prior temperature readings to provide a filtering function and store a temperature value. Although any number of samples may be taken for the purposes of averaging, we will assume that the number of such samples is 16. Therefore, for each probe, there is a storage queue of 16 memory locations and a sample index having a range of values of from 0 to 15. The first process step 140 of the A/D service subroutine illustrated in FIG. 5 checks whether the right sample index is equal to its maximum value, i.e., 15. If not, pursuant to step 142, the multiplexer in the A/D convertor 100 is effective to convert the analog signal on line 113 to a corresponding digital signal and load that digital signal into a memory location associated with the current right sample index number. In process step 144, the right sample index is incremented by one. In process step 146, magnitudes of the stored digital values in the right probe queue are averaged, and an average probe value is stored.

The EPROM 86 contains a look-up table relating thermistor probe resistance to temperature values. The table is created as a function of the characteristic curve of the thermistor associated with the temperature probe. The average probe value is located in the table, and a current temperature is read from the table and stored in RAM 84 for future reference and use. In decision step 148, the subroutine checks whether the right sample index is equal to 15. If not, process steps 140 through 148 are iterated in response to subsequent 10 ms interrupts. When process in step 148 detects the right sample index to equal 15, process in step 150 sets the left sample index to zero. Further, during the next temperature interrupt, in step 140, the process will direct the subroutine to step 152 in which the process requires that the A/D convertor 100 multiplex the left channel thereby creating a digital probe value for the left probe. In step 154, the process is effective to increment the left sample index. In step 156, the process then produces an average probe value for all probe values in the left probe queue and reads a current temperature corresponding to the average probe value from the thermistor resistance-temperature table stored in EPROM 86. The subroutine then detects when the left sample index is equal to 15 in process step 158; and thereafter, pursuant to process step 160, the right sample index is set to zero.

The operation of the heater for the fryer is controlled by a closed loop control using temperature as a control variable. The control loop utilizes a control algorithm known as a proportional, integral, derivative (PID) control. The PID control is operative to rapidly raise the temperature of the oil toward a temperature set point. As the temperature approaches the set point, the PID control is effective to reduce the heat so that the rate of temperature rise is reduced thereby optimizing overshoot of the temperature set point and the heat input to the system. The PID control loop controls the heat applied to the system whether the temperature is above or below the temperature set point. The PID control can be expressed mathematically by the following equation $$U_n = K_p[e] + K_i \int e[d(t)] + K_d[d(e)/d(t)] \qquad (1)$$

where
e = temperature error from set point
$K_p$, $K_i$, $K_d$ = proportional, integral and derivative constants, respectively
$U_n$ = system heat input For the equation to be evaluated by numerical methods in a computer, the equation is rewritten as follows $$U_n = K_p(T_{sp} - T_n) + K_i[(T_{sp} - T_{n-1}) + \qquad (2)$$
$$(T_{sp} - T_{n-2}) + \ldots + (T_{sp} - T_{n-m})] + K_d[(T_n - T_{n-1}) +$$
$$(T_{n-1} - T_{n-2}) + \ldots + (T_{n-m+1} - T_{n-m})]/m$$

where
$T_{sp}$ = set point temperature
m = number of samples
n = current sample
$T_n$ = temperature of oil for sample (n)
$K_p$, $K_i$, $K_d$ = proportional, integral, and derivative constants, respectively
$U_n$ = system heat input The proportional term of the PID control loop controls system heat input as a function of the proportional constant $K_p$ and the magnitude of the instantaneous current temperature error. Since proportional control requires an error, generally, the system will not stabilize at the set point (zero error) but at a value slightly above or below the set point resulting in an offset. The integral term of the PID control loop controls the heater as a function of integral constant $K_i$ and a sum of a predetermined number of successive temperature errors. Therefore, the integral control is effective to reduce or eliminate the offset presented by a pure proportional control. The problem with the integral control is that it is slow to act and slow to respond to change. To improve the system response, the derivative term of the PID control is used. The derivative term controls system heat input as a function of derivative constant $K_d$ and the direction and rate of change of the error temperature. The derivative term is determined by detecting changes in successive temperature errors. Those changes represent how fast the oil temperature is changing and whether the temperature is rising or falling. For rapidly falling or rapidly rising temperatures, the changes in the derivative will result in the application of more heat or less heat, respectively, than would otherwise be applied by simple proportional control.

Figure 6:
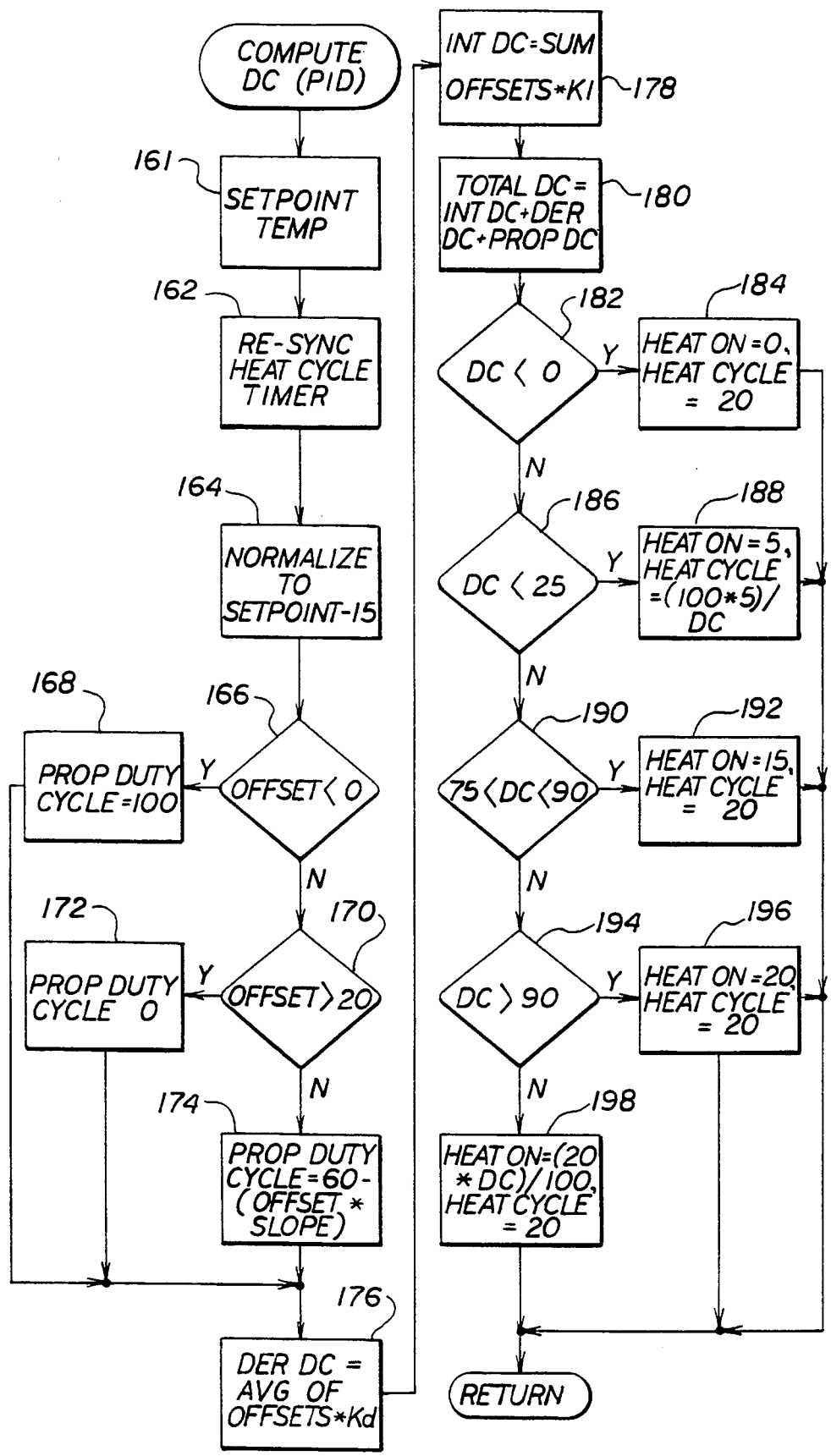
FIG. 6 is a flowchart illustrating the process steps required to execute a PID heat control cycle.
Figure 8:
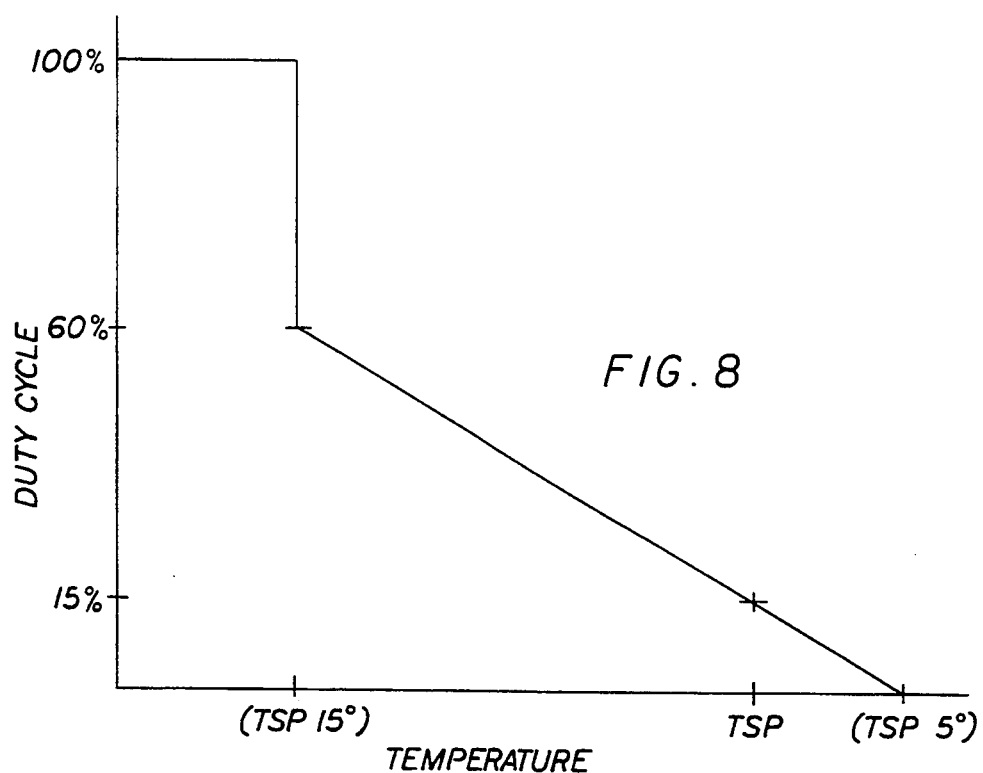
FIG. 8 is a graphical representation illustrating a control of heater duty cycle as a function of temperature.

FIG. 6 is a flowchart of the process steps required to define a desired duty cycle. The implementation of that process requires the solution of Equation (2). Equation (2) may be solved in several ways, and the controller 36 uses several techniques. With regard to the solution of the proportional term, it is first necessary to determine what duty cycle is required for various instantaneous temperature errors. It was experimentally determined that for a given heater on a given fryer, the heater could maintain the set point, i.e., predetermined, temperature ($T_{sp}$) by operating with a 15% duty cycle. Next, it was decided to turn the heat off, i.e., zero duty cycle, at a temperature of 5° F. above the set point ($T_{sp}$ +5° F.). Given those two points, the relationship of duty cycle to temperature around the set point was defined as a linear relationship as illustrated in FIG. 8. Finally, in order to optimize the rate of temperature increase at lower oil temperatures, the heater is operated at a 100% duty cycle for all temperatures less than 15° F. below the temperature set point.

In the implementation of the above, the process in step 161 first requires that a temperature set point be determined. Typically, the temperature set point is a predetermined temperature that is associated with a particular product. As will be subsequently described, the temperature set point may also be a default value, a set back value, etc.. Next, in step 162 of FIG. 6, the process requires the heat cycle timer be resynchronized. There are several timing stages in the temperature control; and although they are clocked from the 100 ms main timer interrupt, it is possible that the timers can lose synchronization. If that happens, the timers are resynchronized in process step 162. Next, in process step 64, the temperature calculation is normalized to a temperature equal to 15° F. below the temperature set point. In other words, a temperature error is defined as the current oil temperature ("T") relative to a temperature of ($T_{sp}$−15° F.). Therefore, a zero temperature error is defined when T=($T_{sp}$−15° F.). The process in step 166 determines whether the temperature error is less than zero, i.e., T<($T_{sp}$−15° F.) . For current temperatures less than the normalized temperature, the heater duty cycle is set to 100% as indicated in process step 168. The process in step 170 determines whether the normalized temperature error is greater than or equal to 20, i.e., T≧($T_{sp}$+5° F.). If so, the duty cycle is set to zero as indicated in process step 172.

If ($T_{sp}$−15° F.)≦T<($T_{sp}$+5° F.), the duty cycle will be defined in terms of Equation (2). The first step of that process is to solve for the proportional term of the equation which utilizes the relationship defined by the curve of FIG. 8. Since the relationship of FIG. 8 is linear, it may be stored as a proportionality constant equal to the slope of the straight line, or as a table of values defined by the solution of the equation for the straight line. Therefore, pursuant to step 174, given the relationship of FIG. 8, the proportional term duty cycle may be determined as a function of temperature error by subtracting from sixty percent the product of the slope of FIG. 8 times the temperature error.

In the solution of equation (2), the number of temperature samples used in the solution of the integral or derivative terms is a matter of design choice and depends on the response characteristics of the system being controlled. In an oil heating system, five integral terms and three derivative terms have proven satisfactory. The constants are chosen such that the solution provides a normalized value of heat input required for the current sample. For example, if the solution produces a unity result, full heat or a 100% duty cycle is required. A zero result means no heat or a zero duty cycle is required.

Given the temperature set point and the temperature readings for various samples, the integral and derivative duty cycle values are determined as set forth in process steps 176 and 178. In process step 176, the derivative duty cycle is calculated by multiplying the derivative constant times the change in temperature error. In the preferred embodiment, it was decided to make the derivative term more responsive to temperature error change. Therefore, the change in temperature error based on three successive changes in temperature error is cubed prior to being multiplied by the derivative constant. In process step 178, the integral duty cycle is calculated by multiplying the integral constant times the sum of the last five temperature errors. Solution of the proportional, integral and derivative terms provides respective proportional, integral and derivative duty cycle values which are summed pursuant to process step 180 to provide a desired duty cycle. The sum is a desired duty cycle representing the amount of heat required by the system for the current temperature sample to provide a temperature response consistent with the chosen proportional, integral and derivative constants.

The duty cycle or rate of the system heat input is equal to the ratio of the heater on-time to the full heater cycle time, i.e., heater on-time plus heater off-time. In the preferred embodiment, the minimum on-time for duty cycle calculations is five seconds. Typically, five seconds is the minimum amount of heater on-time which will add a measurable quantity of heat to the oil. Further, a lesser on-time may adversely effect the life of heater components, e.g., a gas valve. Therefore, depending on the calculated duty cycle, the heater is operated in a way to provide the most practical application of heat. Process step 182 determines whether the desired duty cycle is equal to or less than zero. If so, the heater on-time is set to zero, and the full heater cycle time is set to 20 seconds as indicated in process step 184. In decision block 186, a check is made to determine whether the duty cycle is less than 25%. If so, the heater on-time is set to five seconds and the heater off-time is extended to provide the desired duty cycle. That is accomplished by defining a duty cycle as the quotient of five seconds divided by the calculated duty cycle. Next, decision step 190 determines whether the duty cycle is greater than or equal to 75% but less than 90%. If so, as indicated in process step 192, the heater on-time is set at 15 seconds and the full heater cycle time is set to 20 seconds. In decision block 194, the process tests whether the duty cycle is greater than or equal to 90%. If so, as indicated in process step 196, the duty cycle is set to 100% by establishing a heater-on time of 20 seconds and a full heater cycle time of 20 seconds. If the calculated duty cycle does not fall within any of the previously tested ranges, it is greater than or equal to 25% and less than 75%. In that situation, as indicated in process step 198, the full heater cycle time is set to 20 seconds, and the heater on-time is set to a corresponding time as defined by the calculated duty cycle.

To provide an output signal corresponding to a heater on-time, within the microcontroller, a heater cycle time interval is provided by a means for counting the full heater cycle time. Starting from zero, a number is incremented at a 1 Hz. rate to a number representing the full heater cycle time as determined from the above described PID temperature control, typically, 20 seconds. The desired on-time associated with that cycle is loaded into a comparator monitoring the magnitude of the number being counted. If the comparator detects that the number in the heater cycle counting means is less than or equal to the desired on-time, the oil heater is turned on. When the comparator detects that the number is greater than the desired on-time, the oil heater is turned off.

Upon the application of power to the control, the control will run through an initial diagnostic routine. In the absence of either the melt, idle or cook modes being selected, the control will default to a heating mode and establish a default temperature set point of 350° F.; and the fryer heater (gas or electric) is controlled by the closed loop PID control system as described above. Therefore, the temperature of the oil will be brought up to 350° F. When the oil temperature is less than 335° F., the heater will be operated at a 100% duty cycle. Above 335° F., the PID operation will control the duty cycle to rapidly bring the oil to the set point temperature with an acceptable of overshoot. At 355° F., the heater is turned off, i.e., a zero duty cycle.

The control defines a ready mode, i.e., a state of readiness for cooking when the oil temperature is within a bandwidth of $(T_{sp}-15°$ F.$)\leq T_{sp}\leq (T_{sp}+15°$ F.$)$. Therefore, with a default temperature set point of 350° F., the oil is considered ready for cooking when the oil temperature is in the range of 335° F. to 365° F.; and the control will produce a display message indicating that the oil is ready.

If the initial state of the oil is a solid, a melt mode may be used which permits the solid fat to be melted to a liquid without scorching. If the fat melt mode is enabled and the actual temperature is less than 135° F., the control operates to apply heat at a 10% duty cycle. When the control detects an oil temperature in excess of 135° F., the system operation switches to the heating mode.

The control provides an idle selection which allows an operator to manually engage the idle mode. If the idle mode is engaged, the temperature set point is reset to 350° F.; and control of temperature is under PID control. Upon the operator disengaging the idle mode, the control returns the system to the ready mode; and the temperature set point is set to the default value of 350° F.

A setback mode may be activated in one of two ways. If the control senses no cooking activity for a predetermined period of time, e.g., 30 minutes, the control will automatically switch to the setback mode. Alternatively, an operator selectable setback is available to provide an average lower temperature for the oil thereby extending the oil life. Oil life is inversely proportional to the temperature history of the oil. The higher the oil temperature, the shorter the oil life and vice versa. The control establishes a temperature set point of 275° F. as the setback temperature. If setback has been selected, the setback mode will reset the temperature set point to 275° F. and the oil will be brought to that temperature under PID control. When the setback mode is disengaged, the temperature set point is reset to 350° F.

Figure 7:
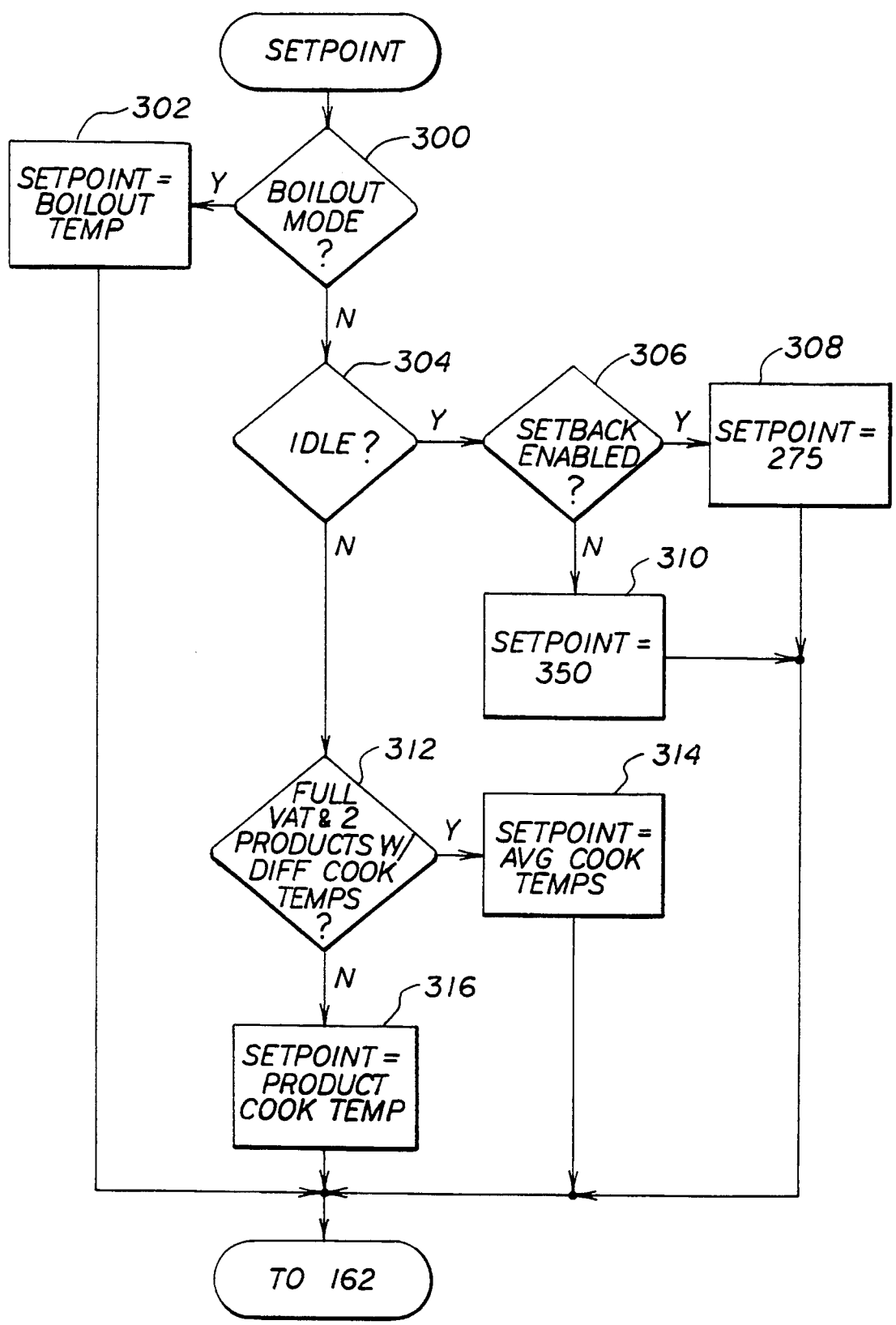
FIG. 7 is a flowchart of process steps required to establish a temperature set point.

FIG. 7 illustrates process steps associated with a determination of the temperature set point which is shown in block 161 of FIG. 6. The process in decision block 300 determines whether the boilout mode has been selected by the operator. The boilout mode is used to boil water in the fryer thereby cleaning the fryer. If so, the temperature setpoint is equal to the programmed boilout temperature pursuant to process step 302. If the boilout mode has not been selected, the process moves to decision block 304 to determine whether the idle mode is selected. If so, per decision block 306, a test is made for the setback mode. If the setback mode is active, in step 308, the process sets the temperature set point back to 275° F. If the setback mode is not active, the temperature set point is set to the default temperature of 350° F. In decision block 312, the process detects whether two products having different predetermined oil temperatures have been selected for cooking in the same vat of oil. If so, per step 314, the temperature set point is set to an average temperature between the two predetermined temperatures associated with the two different products. If the above has not been selected by the operator, the process in step 316 is effective to change the temperature set point to the predetermined temperature associated with the selected product.

Cooking Mode

Prior to initiating a cooking cycle, the control permits the operator to utilize the control panel 42 to program product and other information into the controller 36. In order to prevent inadvertent key entries, to enter the programming mode, it is required that the operator depress two keys simultaneously. Once in the programming mode, the operator may use up and down arrow keys 203 to move between programming menu selections displayed in the readout 44. For example, using the up and down arrow keys will permit the operator to select between the options of editing a product program, selecting a setback temperature, calibrating the temperature system, setting boilout temperature, viewing the recovery time, setting the melt mode, or setting a time-based message relating to an oil-based function, e.g., changing or filtering the oil. If the operator chooses to edit a product program, he may use an enter key 207 to make that selection. Thereafter, the up and down arrow keys may be used to choose between data entries for a product name, a cooking time, a cooking temperature, a duty time, a duty message and a hold time. The duty time and message refer to some intermediate operator action that may be required, e.g., shaking the basket. Upon selecting one of the above by depressing the enter key, right and left arrow keys may then be used to move the cursor to different positions within the display 44. The up and down arrow keys are used to increment and decrement, respectively, through a string of alpha/numeric characters to allow one of those characters to be selected for the cursor position. After all of the data has been entered, an exit key 209 may be used to return to the previous menu. In this way, cooking programs, including selectable cooking data defining a predetermined oil temperature, a predetermined cooking time and other parameters for various products to be cooked as well as other process parameters may be programmed, i.e. entered into the control.

FIG. 9 illustrates a general process comprised of the execution of several subroutines by which a product selection is made and a cooking cycle time initiated. In the input block 200, the process detects the selection by the user of one of the product keys 201 on keypad 38. Pursuant to process step 202, a keyboard service routine will identify the key selected and start a five-second product display timer. A display routine will recognize the running of the five-second product display timer and, in turn, display the programmed name of the product associated with the selected key. Finally, the 10 ms main system timer interrupt will effect an update or counting of the product display timer. If there is no further action by the operator, the five-second display timer will time out and, in turn, the display routine will cease displaying the programmed name of the product associated with the selected key.

If, however, within the five-second display interval the user selects a left vat start button 205 or a right vat start button 206, or both, indicated by input block 204, the process in step 208 initializes a cooking cycle. As previously described, a keyboard service routine will recognize the selection of the start/stop key and various other subroutines will be initiated. For example, a predetermined oil temperature will be defined as the current temperature set point, a duty timer and hold timer will be loaded with predetermined duty and hold times, respectively, a predetermined cooking time will be loaded in a display counter, etc. Finally, as indicated in process step 210, output-compare counters are loaded with numbers corresponding to the current temperature error and the cooking mode is initiated by the start of those output-compare counters.

When a product selection is made and a cooking cycle is initiated by the operator, an associated predetermined oil temperature is used as the temperature set point for the temperature control. In addition, an associated predetermined cooking time is loaded into a display counter, and that cooking time is displayed on a readout for the operator. The predetermined cooking time represents a predetermined number of increments, e.g., seconds; and during the cooking cycle, the display counter counts the programmed cooking time toward zero. Therefore, the display indicates the cooking time remaining to the operator. Further, the display counter defines the duration of the cooking cycle which is a third time interval. Obviously, the predetermined cooking time is the desired cooking time at the programmed oil temperature. However, when food, typically taken from a freezer, is introduced into oil heated to the preset temperature, the oil experiences a rapid decline in temperature. Since the oil temperature is lower, the product cooking time must now be extended as a function of the deviation of the oil temperature from the temperature set point.

Figure 10:
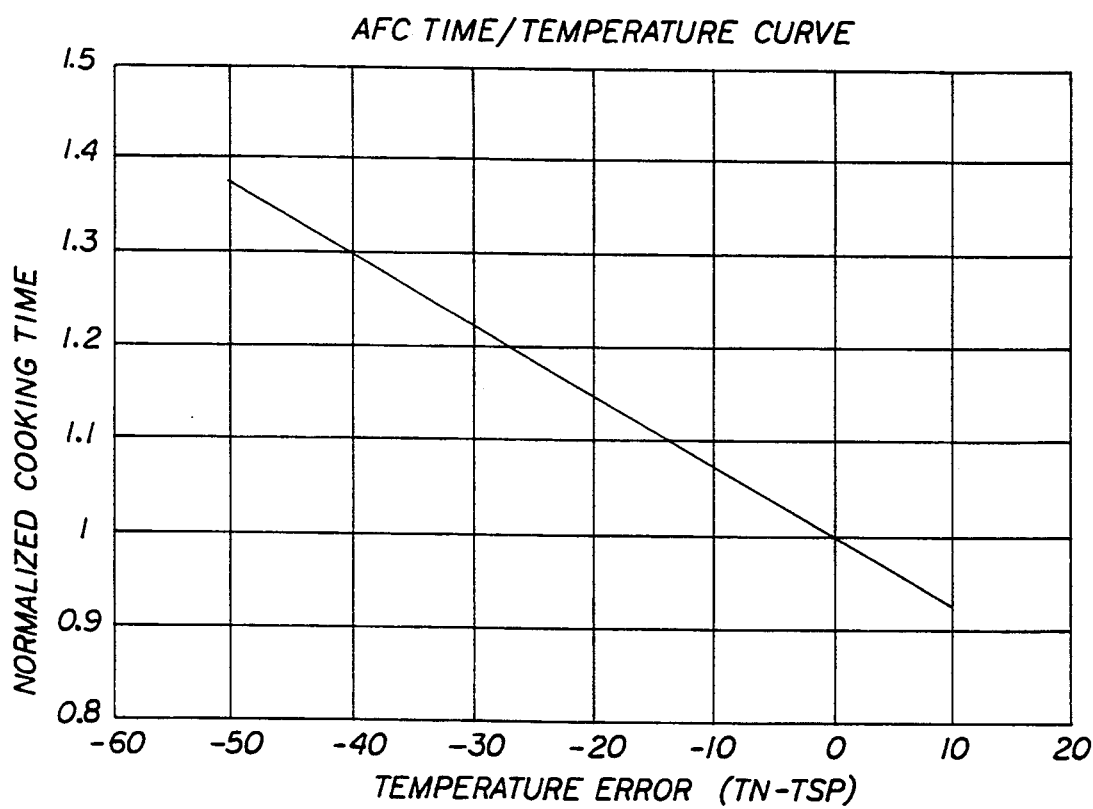
FIG. 10 is a graphical representation illustrating how a predetermined cooking time is changed as a function of temperature error.

The determination of that temperature error-change in cooking time compensation function was determined experimentally. It was assumed that the proper cooking of one food, e.g., potatoes, by deep fat frying occurred when the food product experienced a 35% loss of water content by weight. Laboratory experiments were performed to determine the relationship of cooking time to cooking temperature at the set point and at temperatures above and below the set point. The result of those experiments is shown in FIG. 10 which indicates a linear relationship between desired cooking time and a range of temperature error above and below the temperature set point. Once a cooking time is determined by a product selection, changes to that time due to temperature error may be determined by multiplying the temperature error by a proportionality constant defined by the slope of the line in FIG. 10. Alternatively, the line in FIG. 9 may be stored as a cooking time compensation table in EPROM 86, and, given a temperature error, a change in cooking time may be read or interpolated between table values. The table storage is preferred if the relationship becomes nonlinear.

To better understand the operation of the cooking timing system, a theoretical situation in which the oil temperature remains at the programmed temperature during the whole cooking cycle will be described, that is, the temperature error is zero. When the operator selects the start key indicating that food is introduced into the oil, a first counter effected by an output-compare circuit in microcontroller 80 is operated at a predetermined rate, e.g. 50 milliseconds. Every 50 milliseconds, the first counter is set to a first state or number such that it is clocked a number of times equal to the value of the first state or number every twentieth of a second. Every time the first counter counts the first number and generates an interrupt, a second means for counting is clocked. When the second means for counting is clocked twenty times, i.e., after one second, a clocking transition of a cooking time clock signals is produced to a third counter. The third counter, which is the display counter, has been loaded with the predetermined cooking time and is decremented by one increment. When the display counter counts to zero, a cooking done signal is produced and the cooking cycle is terminated.

If the temperature of the oil changes during the cooking time, and that change results in a desired change in cooking time as determined by the relationship of FIG. 10, the first cooking counter is set to a different state or number, and it is clocked a number of times equal to the second state or number. The states of the first counter are read from the cooking time compensation table within the memory 86 which defines a compensation function relating temperature errors to changes in cooking time. For a given temperature error, a change in cooking time is defined in terms of a number related to the clocking frequency of the first counter. In essence, if the product cooking time must be extended, the first counter is set to a larger state thereby causing it to take a longer time to generate an interrupt. Similarly, if the cooking time is to be shortened, the first cooking counter is set to a lesser state thereby causing it to generate an interrupt in a shorter period of time. The display counter is counting the predetermined cooking time and provides a sequential display to the operator, however, the actual product cooking time and display counter clock are continuously changing as a function of the temperature error induced change in the frequency of the cooking time clock signal.

In the preferred embodiment of the invention, there is a separate cooking time control for each vat. Further, the first cooking counter described in the previous paragraph is implemented for the left and right vats by two output-compare circuits within the microcontroller 80. The second means for counting may be implemented in microcontroller 80 using timer circuits or software timing programs.

FIG. 11 is a flowchart describing the steps required to execute the product cooking timer process for one of the vats. As a matter of design choice, the output-compare counter and second means for counting run continuously. When the output-compare circuit corresponding to a first cooking counter produces an interrupt, the process in step 211 resets the interrupt and loads a new state into the output-compare circuit. Pursuant to process step 212, the second means for counting or second counter is counted by incrementing it one increment. In decision step 214, the process detects whether the second counter has a value equal to 20. If not, the process in step 226 calculates a temperature error which is normalized to a value of approximately 50° F. below the temperature set point; that is the lowest temperature defined by the relationship in FIG. 10 for which a cooking time adjustment may be made. That normalized temperature value is utilized with the time compensation table stored in EPROM 86 to effect a change in the cooking time.

Upon the process in step 214 detecting the second counting means counting to 20, that is an interval of one second; in the absence of temperature error, the process moves to decision step 216 to determine whether a cooking cycle has been initiated. Since the cooking time counters run continuously, a determination must be made whether a cooking cycle has been initiated. Process step 216 detects the presence of a cooking cycle by monitoring the contents of the display counter. If the display counter has been loaded with a cooking time, the process in step 216 determines that a cooking cycle has been initiated. Thereafter, in step 218 the process decrements the display counter by one increment. Thereafter, per decision step 220, the process determines whether the display counter is zero. If not, the process moves to process step 224 which requires an update of the duty timer. The process of FIG. 11 is executed with each interrupt from an output-compare circuit, if a duty time has been programmed. When the duty timer is equal to the programmed duty time, the programmed duty message will be displayed. The process of FIG. 11 continues to iterate until in decision step 220 the process detects that the display counter is zero. At that point, process step 222 causes display subroutines to provide a DONE message.

The control contains a second temperature sensor, a second temperature control, a second set of cooking counters and a second display counter all of which operate identically to but in parallel with the temperature control and cooking time control for the first product. Consequently, two products may be cooked simultaneously but separately in the two vats of oil, however, two products may also be cooked simultaneously but in a single vat of oil.

It is well within the skill of those in the art to code programs following the steps of the flowcharts described herein. In applicants' preferred embodiment, applicants used an ANSI Compatible-Language Compiler commercially available from Introl. The compiler version is one compatible with the HC11 family of microcontrollers previously identified.

Although particular embodiments of the present invention have been illustrated and described, it will be apparent to those who are skilled in the art that various changes and modifications may be made without departing from the spirit and scope of the present invention. Accordingly, it is intended to encompass within the appended claims all such changes and modifications that fall within the spirit and scope of the present invention.

What is claimed is:

1. A fryer comprised of at least one vat of oil for cooking a product, a heating means for heating the oil and a fryer control comprising:
   a. means for storing at least one set of cooking data for a product, said cooking data defining a predetermined oil temperature and a predetermined cooking time;
   b. means for producing an oil temperature signal representing a current oil temperature;
   c. means responsive to the oil temperature signal and the cooking data for providing a temperature error signal as a function of the difference between the current oil temperature and the predetermined oil temperature;
   d. means responsive to the temperature error signal for producing a heater control signal representing a desired duty cycle of the heater, said heater control signal being determined as a function of a current temperature error signal, a sum of a predetermined number of successive temperature error signals and a sum of changes between the successive temperature error signals;
   e. means for storing a cooking time control function relating a change in cooking time to temperature error within a predetermined range of temperature error greater than and less than the predetermined oil temperature;
   f. means responsive to the temperature error signal and the cooking time control function for providing a cooking time clock signal having a frequency varying proportion to the temperature error signal; and
   g. means responsive to the predetermined cooking time for counting the predetermined cooking time, said counting means being responsive to the cooking time clock signal whereby the counting means counts the predetermined cooking time at a frequency varying as a function of the temperature error signal.

2. The apparatus of claim 1 wherein the means for producing an oil temperature signal further comprises:
   a. means for producing an analog signal as a function of variations in temperature of the oil;
   b. means for converting the analog signal to a corresponding digital signal;
   c. means for providing the oil temperature signal by averaging a predetermined number of digital signals over a predetermined period of time.

3. The apparatus of claim 1 wherein the means for providing a cooking time clock signal further comprises:
   a. first counter means;
   b. means responsive to the temperature error signal and the cooking time control function for setting the first counter means to a first state representing a value defined by the temperature error signal and the cooking time control function;
   c. means for clocking the first counter means at a predetermined frequency;
   d. means for detecting a change of state of the first counter equal to the value defined by the first state; and
   e. means for producing a clocking transition of the cooking time clock signal in response to detecting the change of state of the first counter means, thereby providing a cooking time clock signal having a frequency being a function of the temperature error and the cooking time control function.

4. The apparatus of claim 3 wherein the means for producing a clocking transition of the cooking time clock signal further comprises:
   a. a second means for counting;
   b. means for setting the second means for counting to a predetermined second state;
   c. means for clocking the second means for counting in response to detecting the change of state of the first counter means;
   d. means for detecting a change of state of the second means for counting equal to a magnitude defined by the predetermined second state;
   e. means for producing the clocking transition of the cooking time clock signal in response to detecting the change of state of the second means for counting.

5. The apparatus of claim 1 wherein said predetermined range of temperature error is 60 degrees.

6. The apparatus of claim 2 wherein the means for producing an analog signal is a thermistor placed in the oil, the thermistor producing an analog signal have an amplitude varying as a function of variations in the oil temperature.

7. A method for operating an oil fryer having at least one vat of oil, an oil heater, temperature sensing means producing a signal as a function of oil temperature and a fryer control for controlling oil temperature and cooking time of a product in the fryer, the method comprising the steps of:
   a. storing selectable cooking data for products to be cooked, said selectable cooking data for a first product including a predetermined oil temperature and a predetermined cooking time, said predetermined cooking time representing a predetermined number of increments;
   b. sampling the signal produced by the temperature sensing means to determine a current oil temperature;
   c. detecting selection of selectable cooking data for the first product;
   d. determining a temperature error in response to the current oil temperature and the predetermined oil temperature;
   e. calculating a desired duty cycle of the oil heater as a function of the temperature error, a sum of a predetermined number of successive temperature errors and a sum of changes between the successive temperature errors;
   f. applying power to the oil heater for a period of time defined by the desired duty cycle thereby causing the current oil temperature to be approximately equal to the predetermined oil temperature; and
   g. generating a cooking cycle in response to detecting selection of the selectable cooking data for the first product, said cooking cycle having a duration proportional to the predetermined cooking time and the temperature error, and during said cooking cycle i) producing a clock signal having a frequency dependent on the temperature error, ii) counting the increments of the predetermined cooking time in response to the clock signal, and iii) producing a cooking done signal in response to counting the predetermined number of increments of the predetermined cooking time.

8. The method of claim 7 wherein the temperature sensing means produces a digital signal having a magnitude varying as a function of variations in the oil temperature and the step of sampling signal produced by the temperature sensing means further comprises the steps of:

a. detecting a predetermined number of magnitudes of the digital signal; and b. producing an average value of the magnitudes of the stored digital signals.

9. The method of claim 8 wherein the temperature sensing means is a circuit including a thermistor producing an analog signal having an amplitude varying as a function of variations in the oil temperature, said thermistor having a predetermined resistance-temperature relationship, and the step of sampling the signal produced by the temperature sensing means further comprises the steps of:

a. converting the analog signal to the digital signal having a magnitude corresponding to the amplitude of the analog signal; and b. producing the current temperature as a function of the average digital signal and the predetermined resistance-temperature relationship.

10. The method of claim 7 wherein the step of calculating the desired duty cycle further comprises the steps of defining a duty cycle in the range of approximately 100% to 0% in response to the temperature error having a range between a first predetermined magnitude below the predetermined oil temperature and a second predetermined magnitude above the predetermined oil temperature.

11. The method of claim 10 wherein the first predetermined magnitude is approximately equal to 15° F. and the second predetermined magnitude is approximately equal to 5° F.

12. The method of claim 7 wherein the method further comprises prior to the step of generating a cooking cycle the step of determining the oil to be ready for cooking in response to the oil temperature being within a predetermined range of the predetermined oil temperature.

13. The method of claim 12 wherein the predetermined range is approximately between 15° F. above and 15° F. below the predetermined oil temperature.

14. The method of claim 7 wherein the step of calculating a desired duty cycle further comprises the steps of:

a. determining a proportional duty cycle value as a function of the product of the temperature error signal times a proportionality constant;

b. determining a derivative duty cycle value as a function of the product of a constant times a sum of a predetermined number of temperature errors;

c. determining an integral duty cycle value as a function of a product of a constant times a value representing a change in the temperature error; and d. summing the proportional, derivative and integral duty cycle values to provide the desired duty cycle of the operation of the oil heater.

15. The method of claim 7 wherein the step of calculating a desired duty cycle further comprises the step of calculating a value according to the following:

$$U_n = K_p(T_{sp} - T_n) + K_i[(T_{sp} - T_{n-1}) +$$
$$(T_{sp} - T_{n-2}) + \ldots + (T_{sp} - T_{n-m})] + K_d[(T_n - T_{n-1}) +$$
$$(T_{n-1} - T_{n-2}) + \ldots + (T_{n-m+1} - T_{n-m})]/m$$

where $T_{sp}$ = set point temperature m = number of samples n = current sample $T_n$ = temperature of oil for sample (n)

$K_p$, $K_i$, $K_d$ = proportional, integral, and derivative constants, respectively $U_n$ = system heat input 16. The method of claim 7 wherein the control includes a first counter and the step of producing the clock signal further comprises the steps of:

a. storing a compensation function relating temperature errors to changes of cooking time;

b. setting the first counter to a first state as a function of the temperature error and the compensation function;

c. clocking the first counter at a predetermined frequency;

d. detecting a change of state of the first counter equal to a magnitude defined by the first state;

e. producing a clocking transition of the clock signal in response to detecting the change of state of the first counter; and f. iterating steps b. through e. thereby producing a number of transitions of the clock signal having a frequency being a function of the temperature error and the compensation function.

17. The method of claim 16 wherein the control includes a second means for counting and the step of producing a clocking transition of the clock signal further comprises the steps of:

a. setting the second means for counting to a second state;

b. clocking the second means for counting in response to detecting the change of state of the first counter;

c. detecting a change of state of the second means for counting equal to a magnitude defined by the second state;

d. producing a clocking transition of the clock signal in response to detecting the change of state of the second means for counting; and e. iterating steps a. through d. thereby producing a number of transitions of the clock signal as a function of the first and second states set into the first counter and the second means for counting, respectively.

18. The method of claim 7 wherein the method further comprises the steps of:

a. detecting selection of selectable cooking data defining a predetermined oil temperature for a second product to be cooked simultaneously in the vat of oil with the first product;

b. determining an average temperature equal to an approximate average of the predetermined temperatures associated with the first and second products; and c. using the average temperature in the step of determining a temperature error, 19. The method of claim 7 wherein the method further comprises the steps of:
   a. detecting an event defining an initiation of a temperature set back; and
   b. using a predetermined lower temperature in the step of determining temperature error in response to detecting the event defining an initiation of a temperature set back.

20. The method of claim 19 wherein events defining the initiation of a temperature set back are detecting selection of a temperature set back and detecting a predetermined period of time after cooking a product.

21. The method of claim 7 wherein the method further comprises the steps of:
   a. storing a default oil temperature;
   b. selecting the default oil temperature in the absence of selectable cooking data defining a predetermined oil temperature being selected.

22. A method for operating an oil fryer having at least one vat of oil, an oil heater, temperature sensing means producing a signal as a function of oil temperature and a fryer control for controlling oil temperature and cooking time of a product in the fryer, the method comprising the steps of:
   a. storing selectable cooking data for products to be cooked, said selectable cooking data for a first product including a predetermined oil temperature and a predetermined cooking time, said predetermined cooking time representing a predetermined number of increments;
   b. generating first time intervals and during each of said first time intervals sampling the signal produced by the temperature sensing means to determine a current oil temperature;
   c. detecting selection of selectable cooking data for the first product;
   d. generating second time intervals and during each of said second time intervals
      i. determining a temperature error in response to the current oil temperature and the predetermined oil temperature; and
      ii. calculating a desired duty cycle of the oil heater as a function of the temperature error, a sum of a predetermined number of successive temperature errors and a sum of changes between the successive temperature errors;
   e. applying power to the oil heater for a period of time defined by the desired duty cycle thereby causing the current oil temperature to be approximately equal to the predetermined oil temperature; and
   f. generating a cooking cycle in response to detecting selection of the selectable cooking data for the first product, said third time intervals having a duration proportional to the predetermined cooking time and the temperature error, and during each of said third time intervals
      i) producing a clock signal having a frequency dependent on the temperature error,
      ii) counting the increments of the predetermined cooking time in response to the clock signal, and
      iii) producing a cooking done signal in response to counting the predetermined number of the increments of the predetermined cooking time.

* * * * *

UNITED STATES PATENT AND TRADEMARK OFFICE
CERTIFICATE OF CORRECTION

PATENT NO. : 5,352,866

DATED : October 4, 1994

INVENTOR(S) : Richard W. Cartwright, et al.

It is certified that error appears in the above-identified patent and that said Letters Patent is hereby corrected as shown below:

On the title page
First page, [75] Inventors: "Richard W. Cartwright, Piqua;
Joseph A. Lang, Jr., Kettering;
Raymond M. Lapore, Troy, all of Ohio"
should be changed to
--Richard W. Cartwright, Piqua;
Joseph C. Huang, Dayton;
Joseph A. Lang, Jr., Oakwood;
Raymond M. Lapore, Troy, all of Ohio--.

Column 22, line 20: The phrase "generating a cooking cycle" should be changed to --generating third time intervals--.

Signed and Sealed this

Twenty-eight Day of February, 1995

*Attest:*

BRUCE LEHMAN

*Attesting Officer*  Commissioner of Patents and Trademarks